June 21, 1960 A. L. NEWCOMB ET AL 2,941,657
CHAIN CONVEYOR
Filed March 17, 1958
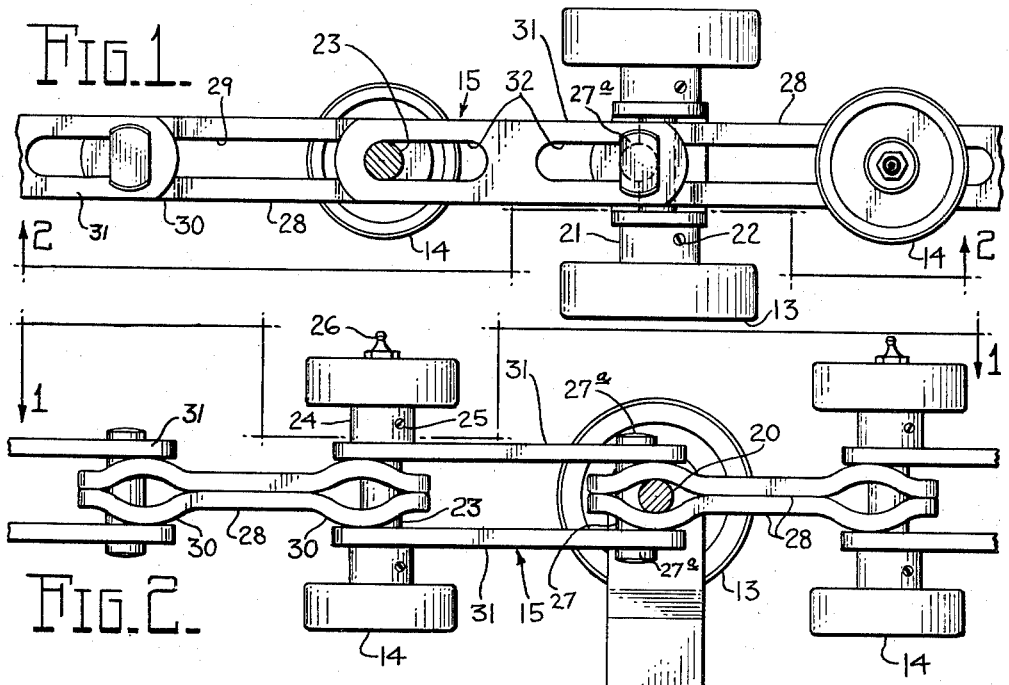
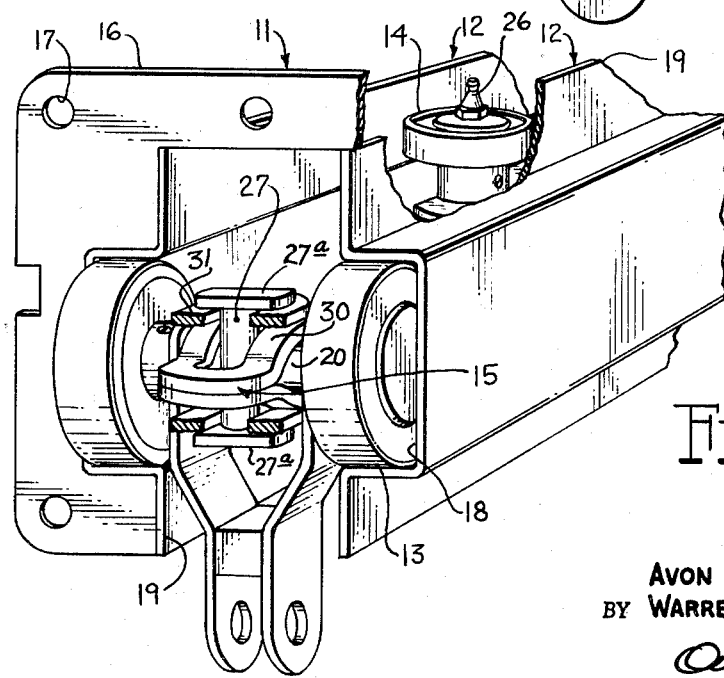
INVENTORS
AVON L. NEWCOMB
BY WARREN L. HOCKERT
Owen & Owen
ATTORNEYS

United States Patent Office 2,941,657
Patented June 21, 1960

2,941,657
CHAIN CONVEYOR

Avon L. Newcomb, Detroit, and Warren L. Hockert, Birmingham, Mich., assignors to The Newcomb-De Vilbiss Company, Detroit, Mich., a corporation of Michigan Filed Mar. 17, 1958, Ser. No. 721,777

3 Claims. (Cl. 198—177)

This invention pertains to chain conveyors and more particularly to a chain conveyor of the type having longitudinally spaced load-bearing and guide wheels, which conveyor has greater flexibility than previously known conveyors of this type.

Conveyors of the type described are well-known in the art. Such conveyors include a pair of load-bearing wheels joined by an axle with a load carrying support depending therefrom. Spaced longitudinally on each side of the load-bearing wheels is a pair of guide wheels joined by an axle perpendicular to the axle of the load-bearing wheels, which axles are connected by chain links. The load-bearing wheels are supported by suitable rails which, in a well-known form, comprise facing C-shaped channels and the guide wheels are located between upper and lower vertical flanges attached to these channels. The guide wheels keep the conveyor assembly from binding, particularly when it passes around horizontal curves. In previous conveyors of this type, the chain links connecting the axles do not enable both vertical and horizontal flexing at each axle. Because of the mutually perpendicular axles of the load-bearing and guide wheels, the chain links are so connected thereto that for the vertical curves, there is substantially no flexing between the chain links joined at the guide wheel axle so that the links are, therefore, stiff between the load-bearing wheels. Likewise, for horizontal curves, there is substantially no flexing between those links that are joined at the axles of the load-bearing wheels so that the links are stiff between the guide wheels. In effect then, the conveyor chain links function the same as links that are twice as long when the chain progresses around either a vertical or a horizontal curve. The permissible radii of curves through which such conveyor chains can travel are thereby longer than would be permissible if the chain links could bend in both horizontal and vertical directions at all axles. Thus the installation of such chains must be designed for the longer radii and this is frequently disadvantageous.

The present invention proposes a conveyor of the type described in which a novel chain and connecting pin arrangement enables the conveyor to have maximum vertical and horizontal flexibility. This is brought about by the fact that each of the chain link connections, at each of the load-bearing wheel axles and guide wheel axles, enables both vertical and horizontal flexing of the adjacent links with respect to one another. Thus, a smooth, even motion of the conveyor around curves is established and the radii of the curves can be shorter, thus enabling the conveyor to have a greater degree of adaptability, so that it can be fitted into and around smaller and tighter places than heretofore possible.

It is, therefore, a principal object of the invention to provide a conveyor of the type described that is more flexible than heretofore known conveyors of a similar type.

Another object of the invention is to provide a conveyor of the type described that can travel around both horizontal and vertical curves of smaller radii.

Other objects and advantages of the invention will be apparent from the following detailed description of a specific embodiment thereof, reference being made to the accompanying drawing, in which—

Fig. 1 is a top view, partially in cross section, of a conveyor chain according to the invention, taken along the line 1—1 of Fig. 2;

Fig. 2 is a side view, partially in cross section, taken along line 2—2 of Fig. 1; and Fig. 3 is a view in perspective of the conveyor chain of Figs. 1 and 2 and shown in operating relationship with a pair of supporting and guiding rails.

Referring to the drawing, a complete conveyor includes many driving and supporting devices that are not shown in the drawing, being omitted in the interests of clarity. The drawing shows only a section of a conveyor 11 including a section of its supporting and guiding rails 12. The conveyor also has load-bearing wheels 13, guide wheels 14, and a section of the connecting and driving chain 15. The rails 12 are supported and spaced by brackets 16 having suitable holes 17 through which supporting rods or members (not shown) are connected. Such members are usually attached to overhead beams of the building in which the conveyor is housed and rigidly suspend the brackets 16 and the rails 12 in a known manner. The rails 12 both support and guide the conveyor chain and wheels along any path desired. The path of such a conveyor frequently must extend around various horizontal and vertical curves so as to circumvent or pass through certain areas, be raised above factory aisles, and the like. Because of space limitations in many factories, the conveyor should be able to travel around curves of minimum radii so that the path thereof can be of any reasonable contour.

The load wheels 13 ride in facing C-shaped channels 18 of the rails 12 and the guide wheels 14 ride between facing flanges 19 extending above and below the rails 12. The guide wheels 14 maintain the conveyor chain assembly centered with respect to the rails 12 and prevent the wheels 13 from binding against the sides of the channels 18, particularly when rounding a horizontal corner. The load wheels 13 rotate on a horizontal axle 20 to which they are connected by collars 21 attached to the axle 20 by means of pins 22. The guide wheels 14 have a vertical axle 23 which rotatably supports the guide wheels through collars 24 connected to the axle by means of pins 25. Each of the load wheels 13 and the guide wheels 14 are rotatably supported on the collars 21 and 24 by suitable bearings (not shown). The upper guide wheel 14 has a suitable grease fitting 26 for easy lubrication.

The axle 20 for the load-bearing wheels 13 has a vertical connecting member or pin 27 with upper and lower elongated flanges 27a. The pin 27 is preferably mutually centered with respect to the axle 20 by means of a notch in the pin or the axle or cooperating notches in both, with the pin preferably integrally welded to the axle 20 to achieve maximum strength. With the pin 27 affixed to the axle 20, a symmetrical location of the chain 15 is thereby assured and possible binding of the axle 20 with links of the chain 15 is eliminated.

An inner pair of chain links 28 have elongated slots 29 through which the axle 20 and the connecting pin 27 extend. The links 28 also have opposed arcuate portions 30 that pass around the axle 20 of the load-bearing wheels 13 and also act to space apart a pair of outer links 31. The outer links 31 each have two elongated slots 32 through which the pin 27 and the vertical axle 23 extend. This arrangement of the chain links enables maximum flexibility for both horizontal and vertical bends. For horizontal curves, the inner links 28 and the outer links 31 are free to pivot around both the vertical axle 23 and the connecting pin 27. Thus, horizontal flexibility is attained at all of the chain link joints. For vertical curves, the inner links 28 are free to pivot vertically by means of their arcuate portions 30 which contact the inner surfaces of the links 31. The links 28 can also pivot vertically around the axle 20 by means of the arcuate portions 30. Thus, vertical flexibility is also attained at each of the chain link joints.

The principles of the invention can be employed equally well by utilizing the connecting pin 27 with the axles 23 of the guide wheels 14 and turning the links 28 and 31 90°. The previously discussed arrangement is generally preferred, however, because a greater amount of horizontal flexibility is thereby obtained and most conveyors require that the horizontal paths have more restricted curves than do the vertical paths which are usually provided with very gentle changes in direction.

It will be understood that at some portions of the chain, it may be desired to have no load-bearing wheels between pairs of the guide wheels or no guide wheels between pairs of the load-bearing wheels. In either case, the axle of the omitted pair of wheels can simply be replaced by a conventional connecting member or pin.

The invention basically pertains to a conveyor of the type having spaced load-bearing wheels and guide wheels. A connecting member is located at one side of an axle of one of the pairs of wheels and is perpendicular thereto. An outer pair of chain links connects the member and another axle or member and an inner pair of chain links connects the first member and still another axle or member. The inner links have opposed arcuate portions that partially surround the axle with which the connecting member is associated. The arcuate portions also serve to space apart the outer links and enable the inner links to pivot with respect thereto.

Various modifications will be suggested from the above discussion of the specific embodiment shown in the drawing. Such modifications can be made without departing from the scope of the invention as defined in the appended claims.

What we claim is:

1. In a chain conveyor having a pair of load-bearing wheels and a pair of guide wheels spaced approximately the length of a chain link from said pairs of load-bearing wheels, the axles of which pairs are mutually perpendicular, the improvement which comprises a connecting pin located adjacent one of the axles and perpendicular thereto, an outer pair of chain links connecting said pin and another axle, an inner pair of chain links connecting said pin and still another axle, said inner pair having opposed arcuate segments, the outer surfaces of which contact the outer links and the inner surfaces of which partially surround the axle with which the pin is associated.

2. In a chain conveyor having a pair of load-bearing wheels and a pair of guide wheels spaced approximately the length of a chain link from said pairs of load-bearing wheels, the axles of which pairs are mutually perpendicular, the improvement which comprises a connecting pin located adjacent an axle and perpendicular thereto, an outer pair of chain links having slots through which said pin and another axle spaced from the first axle extend, an inner pair of chain links pivotally connecting the pin and still another axle, said pair of inner links having opposed arcuate segments, the outer surfaces of which contact the outer links and the inner surfaces of which partially surround the axle with which the connecting pin is associated.

3. In a chain conveyor having a pair of load-bearing wheels and a pair of guide wheels spaced approximately the length of a chain link from said pairs of load-bearing wheels, the axles of which pairs are mutually perpendicular, the improvement which comprises a connecting pin affixed to an axle and both perpendicular to any symmetrical with the longitudinal extent thereof, an outer pair of chain links having slots through which said pin and another axle spaced from the first axle extend, an inner pair of chain links having slots through which said pin and still another axle spaced from the first axle extend, said pair of inner links having opposed arcuate segments, the outer surfaces of which contact the outer links and the inner surfaces of which partially surround the axle to which the connecting pin is affixed.

References Cited in the file of this patent

FOREIGN PATENTS 639,244    Great Britain _____ June 21, 1950